US012785136B2

(12) United States Patent
Kim et al.

(10) Patent No.: US 12,785,136 B2
(45) Date of Patent: Nov. 3, 2026

(54) BATTERY CELL PRESSING MODULE AND CHARGE/DISCHARGE APPARATUS FOR SECONDARY BATTERY HAVING THE SAME

(71) Applicant: WONIK PNE CO., LTD., Suwon-si (KR)

(72) Inventors: Byunghum Kim, Suwon-si (KR); Hyoungjoong Kim, Suwon-si (KR); Woosik Han, Suwon-si (KR); Jeongmok Lee, Suwon-si (KR)

(73) Assignee: WONIK PNE CO., LTD., Suwon-si (KR)

( * ) Notice: Subject to any disclaimer, the term of this patent is extended or adjusted under 35 U.S.C. 154(b) by 766 days.

(21) Appl. No.: 18/126,430

(22) Filed: Mar. 25, 2023

(65) Prior Publication Data

US 2023/0378517 A1 Nov. 23, 2023

(30) Foreign Application Priority Data

Mar. 25, 2022 (KR) ........................ 10-2022-0037418
Mar. 25, 2022 (KR) ........................ 10-2022-0037423
Mar. 25, 2022 (KR) ........................ 10-2022-0037425

(51) Int. Cl.
*H01M 10/04* (2006.01)
*H01M 10/44* (2006.01)
*H01M 50/264* (2021.01)

(52) U.S. Cl.
CPC ..... *H01M 10/0481* (2013.01); *H01M 10/446* (2013.01); *H01M 50/264* (2021.01)

(58) Field of Classification Search
CPC ........... H01M 10/0481; H01M 10/446; H01M 50/264; H01M 10/0404
See application file for complete search history.

(56) References Cited

U.S. PATENT DOCUMENTS

2020/0365868 A1* 11/2020 Son .................. H01M 10/0585

FOREIGN PATENT DOCUMENTS

CN 207269044 U 4/2018
CN 109818077 A 5/2019
(Continued)

OTHER PUBLICATIONS

American Coatings Association, "Protecting Parts with Anti-friction Coatings," 2021 (Year: 2021).*
(Continued)

*Primary Examiner* — Ula C Ruddock
*Assistant Examiner* — Sydney L Kline
(74) *Attorney, Agent, or Firm* — Maschoff Brennan

(57) ABSTRACT

Proposed is a cell pressing module including a plurality of movement guiding units provided on both sides, respectively, of a pressing plate pressing against a battery cell, a movement guiding hole into which a plate moving shaft is inserted by passing-through being formed in each of the plurality of movement guiding units; and a link linking together the movement guiding units arranged adjacent to each other along a lengthwise direction of the plate moving shaft, and adjusting a separation distance between the movement guiding units, wherein both end portions of the link are supported on link fixation members, respectively, that are combined with external surfaces, respectively, of the movement guiding units that are arranged adjacent to each other.

11 Claims, 14 Drawing Sheets

(56) References Cited

FOREIGN PATENT DOCUMENTS

| | | | | | |
|---|---|---|---|---|---|
| CN | 111710895 | A | * | 9/2020 | .......... H01M 10/446 |
| CN | 112820928 | A | * | 5/2021 | ........ H01M 10/0404 |
| EP | 3 748 801 | A1 | | 12/2020 | |
| KR | 10-2012-0038218 | A | | 4/2012 | |
| KR | 1020170118993 | A | | 10/2017 | |
| KR | 1020190011711 | A | | 2/2019 | |
| KR | 1020200041710 | A | | 4/2020 | |
| KR | 20-2020-0002046 | U | | 9/2020 | |
| KR | 20200002046 | U | * | 9/2020 | ........ H01M 10/0481 |
| KR | 10-2021-0097301 | A | | 8/2021 | |
| WO | 2021/194236 | A1 | | 9/2021 | |

OTHER PUBLICATIONS

KR Office Action dated Jun. 22, 2024 in application 1020220037418.
KR Office Action dated Jun. 22, 2024 in application 1020220037423.
KR Office Action dated Jun. 24, 2024 in application 1020220037425.
Extended European Search Report dated Jan. 26, 2024 as received in Application No. 23164075.6.

* cited by examiner

BATTERY CELL PRESSING MODULE AND CHARGE/DISCHARGE APPARATUS FOR SECONDARY BATTERY HAVING THE SAME

TECHNICAL FIELD

The present disclosure relates to a cell pressing module and an apparatus for charging and discharging a secondary battery, the apparatus having the cell pressing module and, more particularly, to a cell pressing module configured in such a manner that a link, linking together movement guiding units arranged adjacent to each other, is detachably attached in a simple way, and an apparatus for charging and discharging a secondary battery, the apparatus having the cell pressing module.

BACKGROUND ART

Secondary batteries are also widely used as an electric power source for driving an electric vehicle, as well as a mobile device, such as a portable phone, a notebook computer, or a camcorder. Particularly, the use of lithium secondary batteries is rapidly increased because it has advantages, such as a high operating voltage and a high energy density per unit weight.

Normally, secondary batteries, such as lithium batteries and lithium-polymer batteries, undergo varies processes, such as an aging process, a charging and discharging process, an open circuit voltage (OCV) inspection process, an internal resistance (IR) inspection process, and a grading process, at a manufacturing factory before shipment. Among these, the charging and discharging process is a critical process that determines quality of a secondary battery produced.

The process of charging and discharging the secondary battery is performed in an apparatus for charging and discharging a secondary battery.

The apparatus for charging and discharging the secondary battery includes a plurality of pressing plates. In a state where a battery cell is inserted, for charging and discharging, between each of the plurality of pressing plates, the pressing plate presses against the battery cell with a predetermined pressure.

In the state where the battery cell is pressed by the pressing plate, an electrode lead gripper module applies electric current to an electrode lead provided on the battery cell, and thus performs the process of charging and discharging the battery cell. The apparatus for charging and discharging the secondary battery performs charging and discharging of the battery cell in temperature and pressure ranges that are required in such a manner that activation of the battery cell is enhanced.

A movement guiding hole is formed in both-side end potions of the pressing plate pressing against the battery cell. A plate moving shaft that connects a first support frame and a second support frame, which are spaced a predetermined distance apart, to each other is inserted into the movement guiding hole by passing-through. Accordingly, the first pressing unit and the second pressing unit may be moved along a lengthwise direction of a plate moving shaft while they press against the pressing plate.

For example, a battery pick-up apparatus may perform an operation of automatically inserting the battery cell that is arranged between each of the plurality of pressing plates. The operation of automatically inserting the battery cell is performed in a state where the plurality of pressing plates are arranged to be spaced a predetermined distance apart for the automatic insertion of the battery cell. To this end, a chain member connecting the neighboring pressing plates to each other is combined with the both-side end portions of the pressing plate. Thus, the plurality of pressing plates may be arranged to be spaced the predetermined distance apart. The chain member may be fixed, by a pin, to a one-side end portion of the pressing plate.

However, in the related art, in a case where the neighboring pressing plates are connected to each other using the chain member, there occurs a problem in that a gap between the pressing plates is not precisely adjusted.

In addition, it is difficult to separate and recombine the chain member configured to be combined by the pin with the pressing plate. Thus, there occurs a problem in that it takes much time to perform an operation of maintaining the apparatus for charging and discharging a secondary battery.

Therefore, there is a need to perform research and development on various cell pressing modules including a link that is configured to adjust the gap between the pressing plates to a predetermined magnitude and to simplify the separation and the recombination.

DOCUMENT OF RELATED ART (Patent Document 1) Korean Patent Application Publication No. 10-2012-0038218 (Apr. 23, 2012)

SUMMARY OF INVENTION

Technical Problem

An object of the present disclosure, which is made to solve the above-mentioned problem, is to provide a cell pressing module configured in such a manner that a link, linking together movement guiding units arranged adjacent to each other, is detachably attached in a simple way, and an apparatus for charging and discharging a secondary battery, the apparatus having the cell pressing module.

Solution to Problem

In order to accomplish the above-mentioned object, according to an aspect of the present disclosure, there is provided a cell pressing module including: a plurality of movement guiding units provided on both sides, respectively, of a pressing plate pressing against a battery cell, a movement guiding hole into which a plate moving shaft is inserted by passing-through being formed in each of the plurality of movement guiding units; and a link linking together the movement guiding units arranged adjacent to each other along a lengthwise direction of the plate moving shaft, and adjusting a separation distance between the movement guiding units, wherein both end portions of the link are supported on link fixation members, respectively, that are combined with external surfaces, respectively, of the movement guiding units that are arranged adjacent to each other.

In the cell pressing module, the pressing plate may be configured to be detachably attached to the movement guiding unit although the movement guiding units are connected by the link to each other, in such a manner that the cell pressing module may be simply replaced.

According to another aspect of the present disclosure, there is provided an apparatus for charging and discharging a secondary battery, the apparatus having the cell pressing module.

Advantageous Effects of Invention

The cell pressing module according to the present disclosure, which is described above, and the apparatus for charging and discharging a secondary battery, the apparatus having the cell pressing module, have the following effects.

According to the present disclosure, an opening is formed in the link linking together the movement guiding units that are arranged adjacent to each other. Thus, the link can be simply combined and separated. Accordingly, the link can disconnect or reconnect the movement guiding units arranged adjacent to each other even in a state where the link fixation member combined with the movement guiding unit is not separated.

In addition, in a state where the movement guiding units arranged adjacent to each other are connected by the link, although damage to the pressing plate takes place, the pressing plate can be simply replaced by being separated from the movement guiding unit, without replacing the entire cell pressing module after disconnecting the link.

The present disclosure is not limited to the effects mentioned above, and it would be understood that any other effect is possibly inferred from Description of Embodiments or constituent elements recited in the claims.

DESCRIPTION OF EMBODIMENTS

Figure 1:
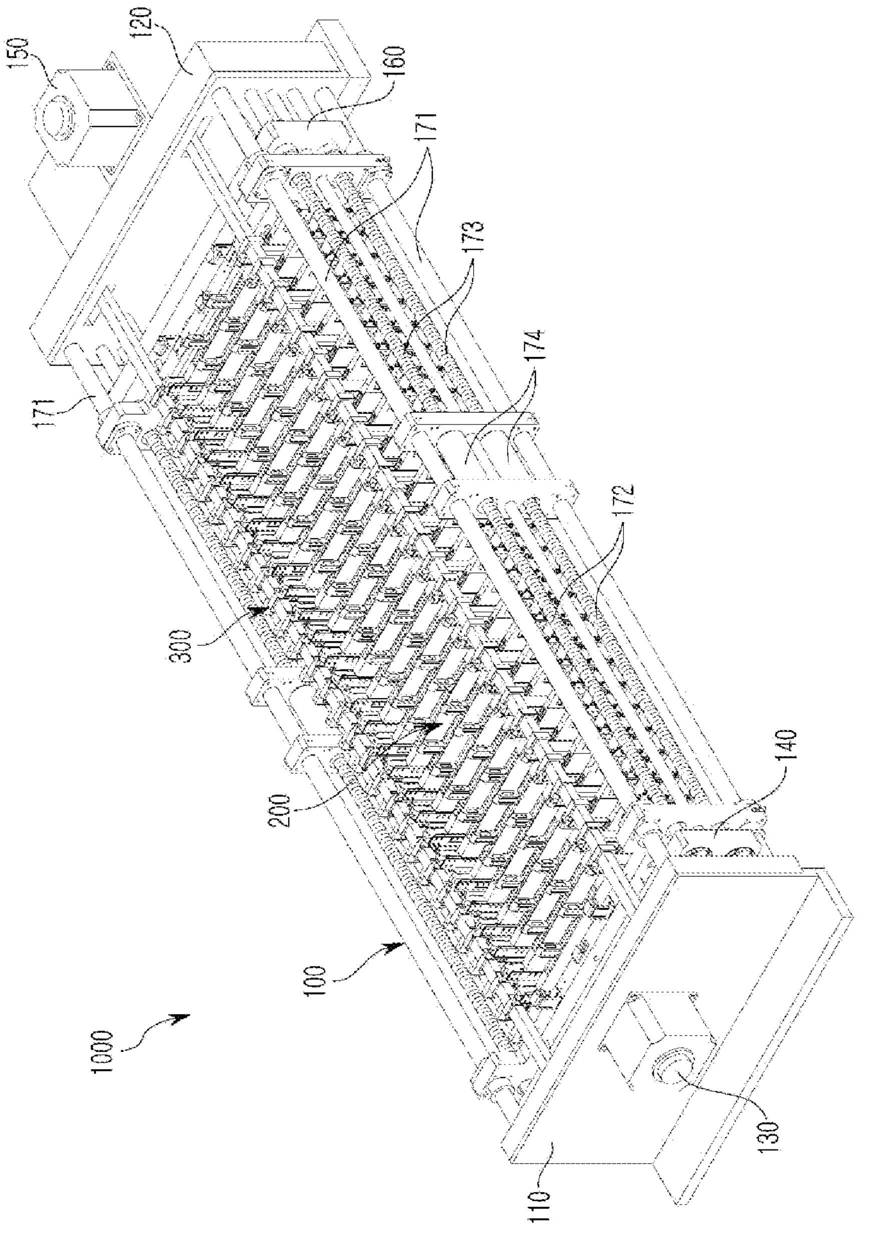
FIG. 1 is a perspective view illustrating an apparatus for charging and discharging a secondary battery according to embodiments of the present disclosure.

Embodiments of the present disclosure will be described below with reference to the accompanying drawings. However, the present disclosure may be implemented in various different forms and therefore is not limited to the embodiments thereof that are described below. In order to definitely describe the embodiments of the present disclosure, a constituent element not associated with the description is omitted from the drawings, and the same constituent elements are given the same reference numeral throughout the present specification.

In addition, when a constituent element is referred to as being “connected to” one other constituent element, the constituent element may be “directly connected to” one other constituent element or may be “indirectly connected to” one other constituent element with a third constituent element member in between.” Unless otherwise specified, the expression “includes a certain constituent element” means that any other constituent element may further be included, not that any other constituent element is excluded.

Throughout the present specification, the terms “over” and “under” mean being at higher and lower levels, respectively, than something, but not necessarily in the direction of gravity.

The embodiments of the present disclosure will be described in detail below with reference to the accompanying drawings.

Figure 2:
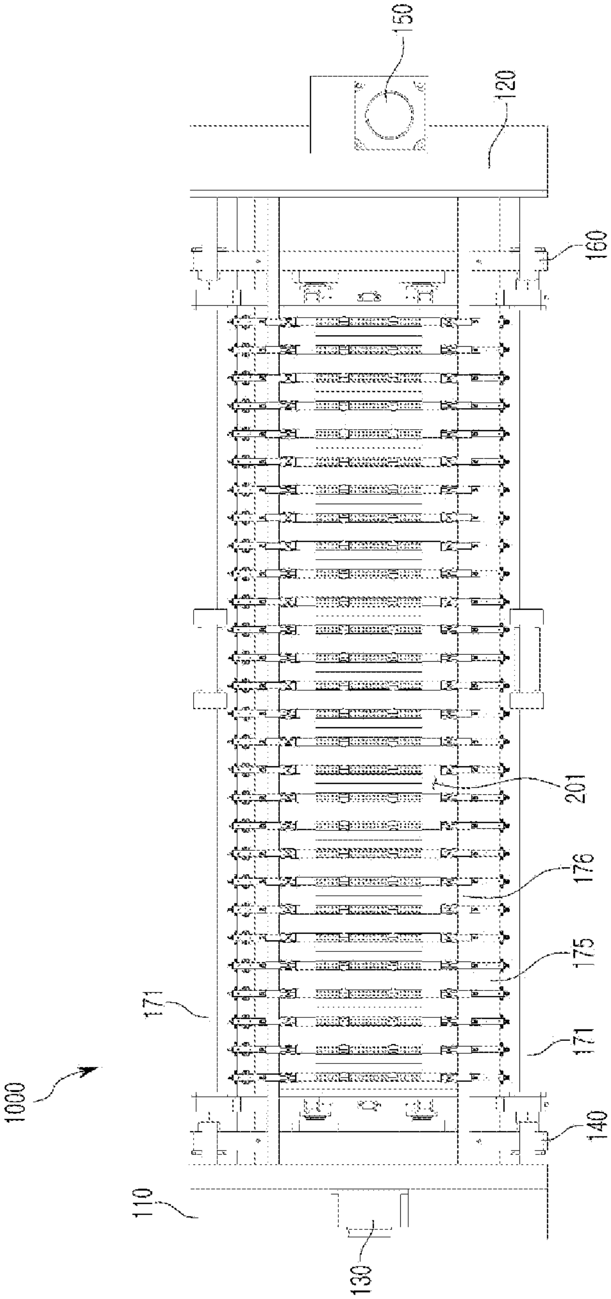
FIG. 2 is a view illustrating the apparatus for charging and discharging a secondary battery according to the embodiments of the present disclosure, when viewed from above.
Figure 3:
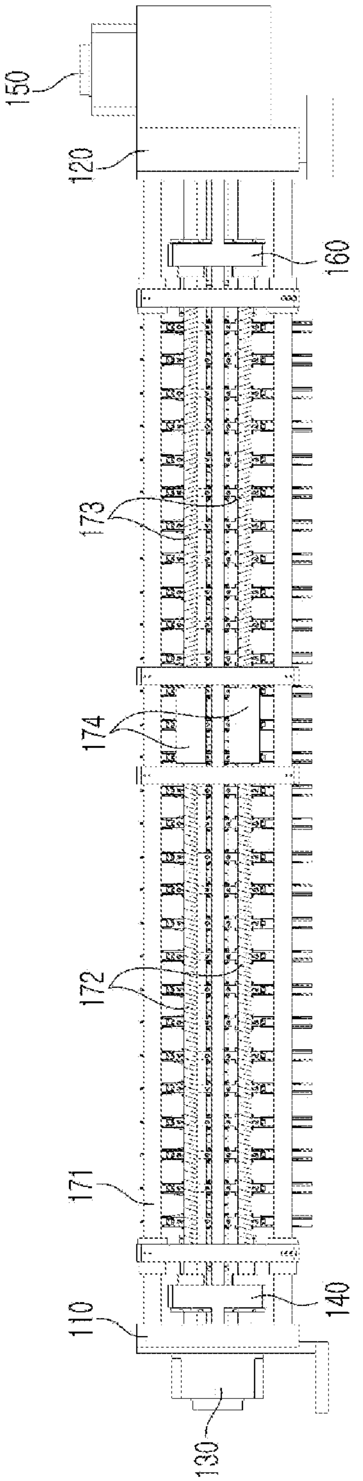
FIG. 3 is a view illustrating the apparatus for charging and discharging a secondary battery according to the embodiments of the present disclosure, when viewed from front.
Figure 4:
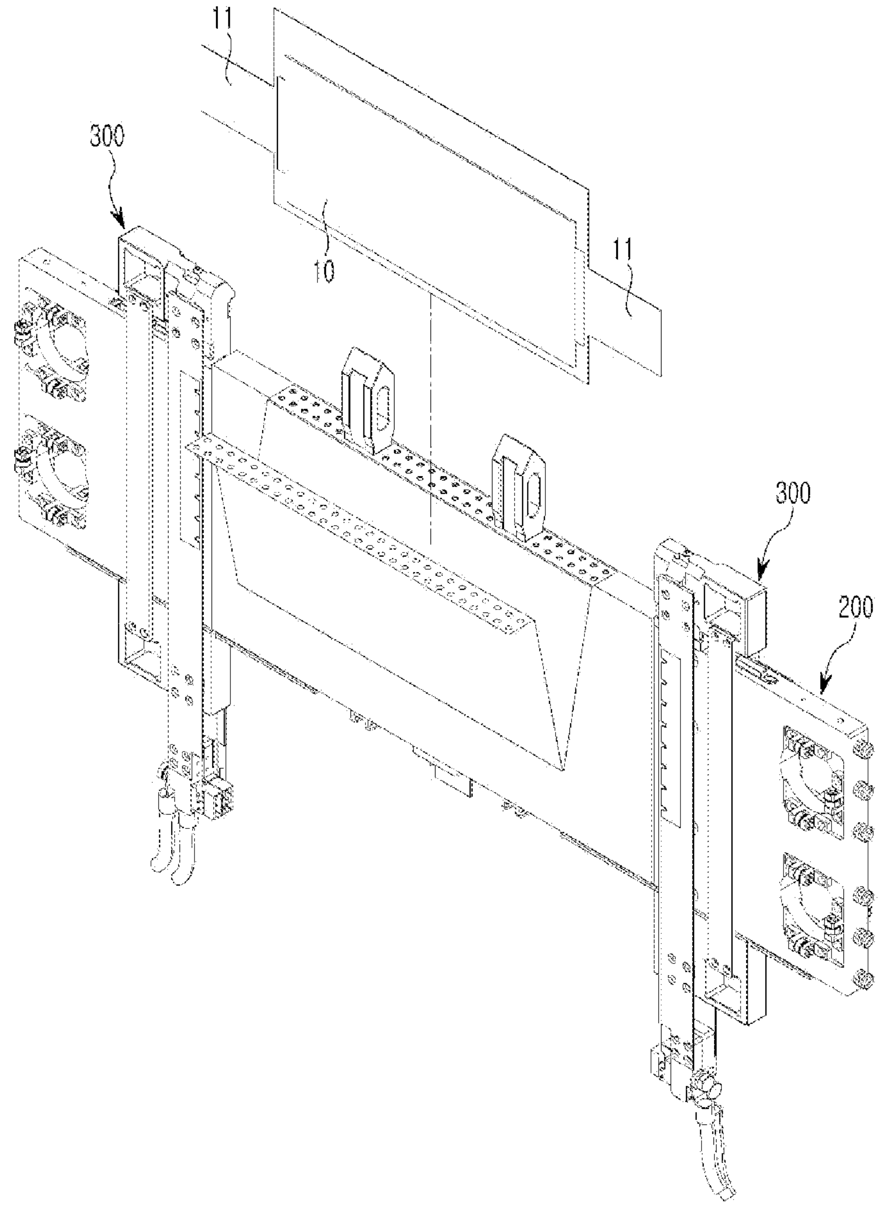
FIG. 4 is a perspective view illustrating a cell pressing module and an electrode lead gripper module according to the embodiments of the present disclosure.
Figure 5:
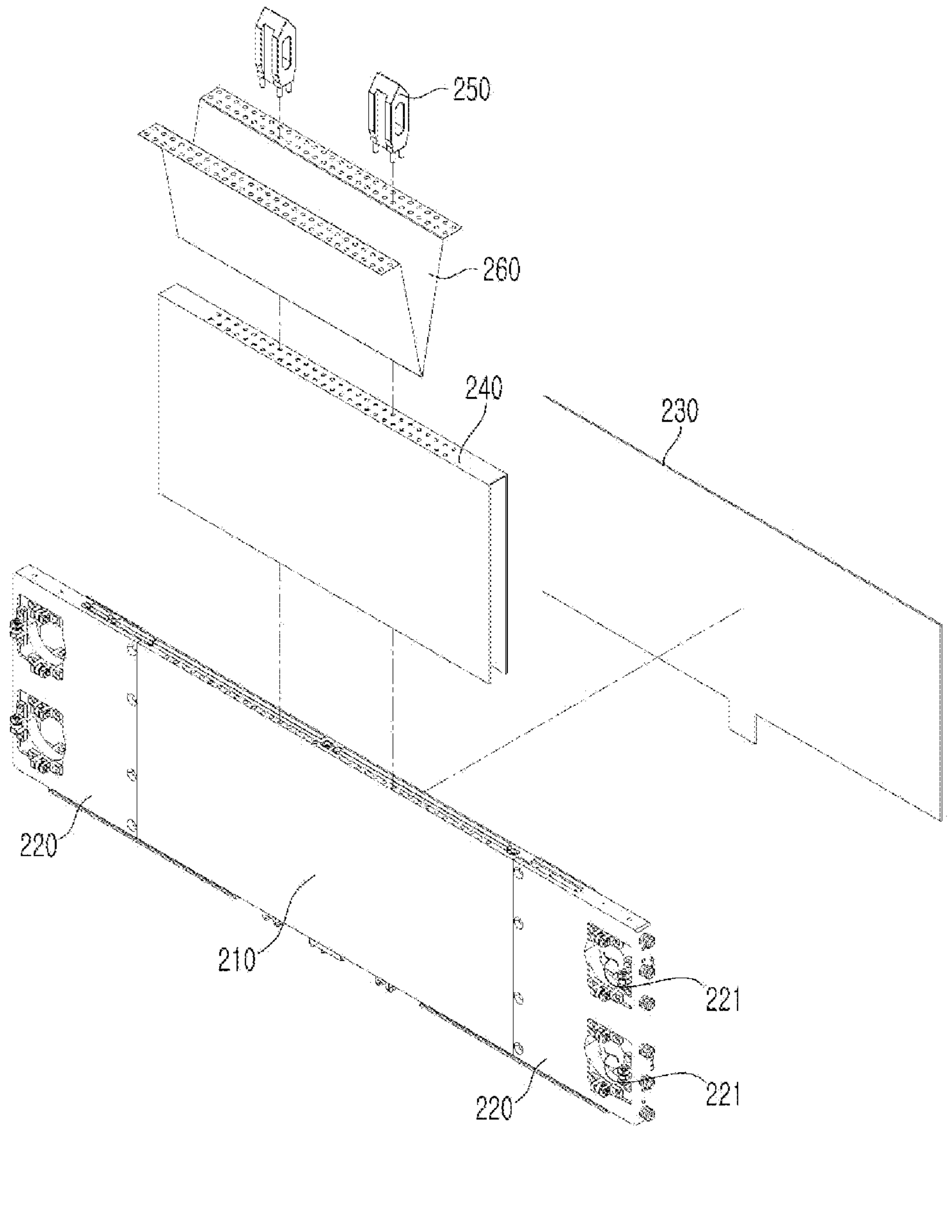
FIG. 5 is an exploded perspective view illustrating the cell pressing module according to the embodiments of the present disclosure.

FIG. 1 is a perspective view illustrating an apparatus for charging and discharging a secondary battery according to embodiments of the present disclosure. FIG. 2 is a view illustrating the apparatus for charging and discharging a secondary battery according to the embodiments of the present disclosure, when viewed from above. FIG. 3 is a view illustrating the apparatus for charging and discharging a secondary battery according to the embodiments of the present disclosure, when viewed from front. FIG. 4 is a perspective view illustrating a cell pressing module and an electrode lead gripper module according to the embodiments of the present disclosure. FIG. 5 is an exploded perspective view illustrating the cell pressing module according to the embodiments of the present disclosure.

As illustrated in FIGS. 1 to 5, an apparatus 1000 for charging and discharging a secondary battery may include a support housing module 100, a cell pressing module 200, and an electrode lead gripper module 300.

The support housing module 100 is configured to form the entire exterior appearance of the apparatus 1000 for charging and discharging a secondary battery and to support various constituents that are included in the apparatus 1000 for charging and discharging a secondary battery.

The support housing module 100 may include a first support frame 110, a second support frame 120, a first pressing drive unit 130, a first pressing unit 140, a second pressing drive unit 150, a second pressing unit 160, a support shaft 171, a second moving screw 172, a second moving screw 173, a screw support bracket 174, a plate moving shaft 175, and a gripper moving shaft 176.

The first support frame 110 and the second support frame 120 constitute one pair, and the first support frame 110 and the second support frame 120 are arranged to be spaced a predetermined distance apart. The first support frame 110 and the second support frame 120 may be fixed to the support shaft 171 by being supported thereon.

A plurality of pressing plates 210 that press against a pouch-type battery cell 10 and a plurality of electrode lead gripper modules 300 that activate a battery cell through charging and discharging of the pouch-type battery cell 10 may be arranged between the first support frame 110 and the second support frame 120 that are arranged to be spaced apart in this manner.

Then, the first pressing drive unit 130 is fixed to the first support frame 110 by being supported thereon. The first pressing drive unit 130 may be a power source, such as a motor.

The first pressing drive unit 130 controls moving of the first pressing unit 140 that presses against the cell pressing module 200. A motive power generated from the first pressing drive unit 130 may be transferred to the first moving screw 172 through a plurality of gears (not illustrated), and thus the first moving screw 172 may be rotated.

The first pressing unit 140 is combined with the first moving screw 172 in a manner that forms a TM screw. Thus, the first pressing unit 140 may be moved along a lengthwise direction of the first moving screw 172 when the first moving screw 172 is rotated. For example, in a case where the first pressing drive unit 130 is rotated forward, the first pressing unit 140 may be moved toward the second support frame 120. Moreover, in a case where the first pressing drive unit 130 is rotated backward, the first pressing unit 140 may be moved away from the second support frame 120. A moving direction of the first pressing unit 140 may vary according to a rotational direction (the forward direction or the backward direction) of the first pressing drive unit 130.

The first moving screw 172 that guides the moving direction of the first pressing unit 140 is configured in such a manner that one end portion thereof is supported on the first support frame 110 and the other end portion thereof is rotatable in a state of being supported on the screw support bracket 174.

The second pressing drive unit 150 is fixed to the second support frame 120 by being supported thereon. The second pressing drive unit 150 may be a power source, such as a motor.

The second pressing drive unit 150 controls moving of the second pressing unit 160 presses against the cell pressing module 200. A motive power generated from the second pressing drive unit 150 may be transferred to the second moving screw 173 through a plurality of gears (not illustrated).

The second pressing assembly 160 may be combined with the second moving screw 173 in a manner that forms a ball screw, and thus the second pressing assembly 160 may be moved along a lengthwise direction of the second moving screw 173 when the second moving screw 173 is rotated. For example, in a case where the second pressing drive unit 150 is rotated forward, the second pressing assembly 160 may be moved toward the first support frame 110. Moreover, in a case where the second pressing drive unit 150 is rotated backward, the second pressing assembly 160 may be moved away from the first support frame 110. That is, a moving direction of the second pressing assembly 160 may vary according to a rotational direction (the forward rotation or the backward direction) of the second pressing drive unit 150.

The second moving screw 173 that guides the moving direction of the second pressing assembly 160 is configured in such a manner that one end portion is supported on the second support frame 120 and that the other end portion thereof is rotatable in a state of being supported on the screw support bracket 174.

For an activation operation, a plurality of the battery cells 10 picked up from a battery pick-up apparatus (not illustrated) may be inserted into battery insertion spaces 201, respectively, each of which is formed between the pressing plates 210 arranged adjacent to each other. At this point, the pressing plates 210 that are arranged adjacent to each other may be connected to each other by a slip sheet 260, and the battery cell 10 inserted into the battery insertion space 201 may be seated on the slip sheet 260.

In a case where the battery cell 10 is seated on the slip sheet 260 in this manner, the first pressing unit 140, which is combined with the first moving screw 172 in a manner that forms the TM screw, is moved at a fast speed to a predetermined reference position.

In a state where the first pressing unit 140 is moved to the predetermined reference position, the second pressing assembly 160, which is combined with the second moving screw 173 in a manner that forms the ball screw, precisely controls moving of the pressing plate 210 in such a manner that the battery cell 10 is pressed with required pressure for pressing. In this manner, the apparatus 1000 for charging and discharging a secondary battery may shorten the time taken to move the pressing plate 210, through the selective moving of the first pressing unit 140 and the second pressing assembly 160 and at the same time may precisely control the pressure for pressing that is applied to the battery cell 10.

As described above, the first pressing unit 140 is combined with the first moving screw 172 in a manner that forms the TM screw, and the second pressing assembly 160 is combined with the second moving screw 173 in a manner that forms the ball screw. Accordingly, the time taken to move the pressing plate 210 that presses against the battery cell 10 may be shortened, and adjustment of the pressure for pressing against the battery cell 10 may be controlled more precisely. That is, the first pressing unit 140 and the second pressing assembly 160 are combined with the moving screws, respectively, in such a manner as to form screws of different shapes. Accordingly, in a state where the first pressing unit 140 is first fast moved to a required reference position, the second pressing assembly 160 may then press against the battery cell 10 in a more precise manner.

A plurality of the cell pressing modules 200 may be provided between the first support frame 110 and the second support frame 120.

The cell pressing module 200 may include the pressing plate 210, a movement guiding unit 220, a heating pad 230, a protective pad 240, a pocket guide 250, and the slip sheet 260.

The pressing plate 210 is configured to press against the battery cell 10 seated on the slip sheet 260.

The movement guiding unit 220 is provided on both sides of the pressing plate 210. The movement guiding unit 220 is configured to be movable along a lengthwise direction of the plate moving shaft 175 that is connected to the first support frame 110 and the second support frame 120. That is, a movement guiding hole 221 into which the plate moving shaft 175 is inserted by passing-through is formed in the movement guiding unit 220. Thus, the movement guiding unit 220 may be moved along the lengthwise direction of the plate moving shaft 175 as the first pressing unit 140 and the second pressing assembly 160 are moved.

The pressing plate 210 is configured to be detachably attached to the movement guiding unit 220. Therefore, in a case where the pressing plate 210 needs to be maintained, an operator may simply separate the pressing plate 210 from the movement guiding unit 220.

For reference, a cell pressing module in the related art is not configured to have a movement guiding unit configured to be detachably attached to a pressing plate. A movement guiding hole into which the plate moving shaft 175 is inserted by passing-through is formed in both sides of a pressing plated in the related art. However, the pressing plate in the related art, when required to be replaced, has to be replaced in a state where all pressing plates, arranged before it, are separated from the plate moving shaft 175. Accordingly, it is difficult to perform an operation of replacing the pressing plate in the related art. In contrast, because the pressing plate 210 according to the present disclosure is configured to be detachably attached to the movement guiding unit 220, an operation of replacing the pressing plate 210 may be simply performed.

Then, the heating pad 230 is configured to heat the pressing plate 210 to a predetermined temperature. The pressing plate 210 presses against the battery cell 10 with a predetermined pressure for pressing in a state of being heated to the predetermined temperature by the heating pad 230.

The protective pad 240 is configured to prevent the pressing plate 210 from causing damage to a surface of the battery cell 10 while the pressing plate 210 presses against the battery cell 10.

The pocket guide 250 is configured to fix the slip sheet 260 and the protective pad 240 to the pressing plate 210 and at the same time to guide an insertion direction of the battery cell 10 in such a manner that the plurality of the battery cells 10 picked up from the battery pickup apparatus are stably inserted into the battery insertion spaces 201, respectively.

The electrode lead gripper module 300 is configured to be movable along a width direction of the cell pressing module 200 in a state of being inserted into the cell pressing module 200. For example, the electrode lead gripper module 300 is configured to be moved selectively along the width direction of the cell pressing module 200 according to a size of the battery cell 10 and to be in a pressurized manner brought into contact with an electrode lead 11 provided on the battery cell 10.

The electrode lead gripper modules 300 constituting one pair may be provided on both sides, respectively, of the cell pressing module 200.

In a state of being brought into contact with the electrode lead 11 by pressure in such a manner as to make an electric connection, the electrode lead gripper module 300 recognizes whether the battery cell 10 is charged or discharged and whether or not the battery cell 10 is defective.

In this manner, the apparatus 1000 for charging and discharging a secondary battery is configured to charge and discharge the battery cell 10 in a state where the pressing plate 210 presses against the battery cell 10. Accordingly, the apparatus 1000 for charging and discharging a secondary battery prevents occurrence of a swelling phenomenon where the battery cell 10 is swelled due to expansion of the battery cell 10 or to occurrence of gas and precisely recognizes whether or not the battery cell 10 is defective.

Figure 6:
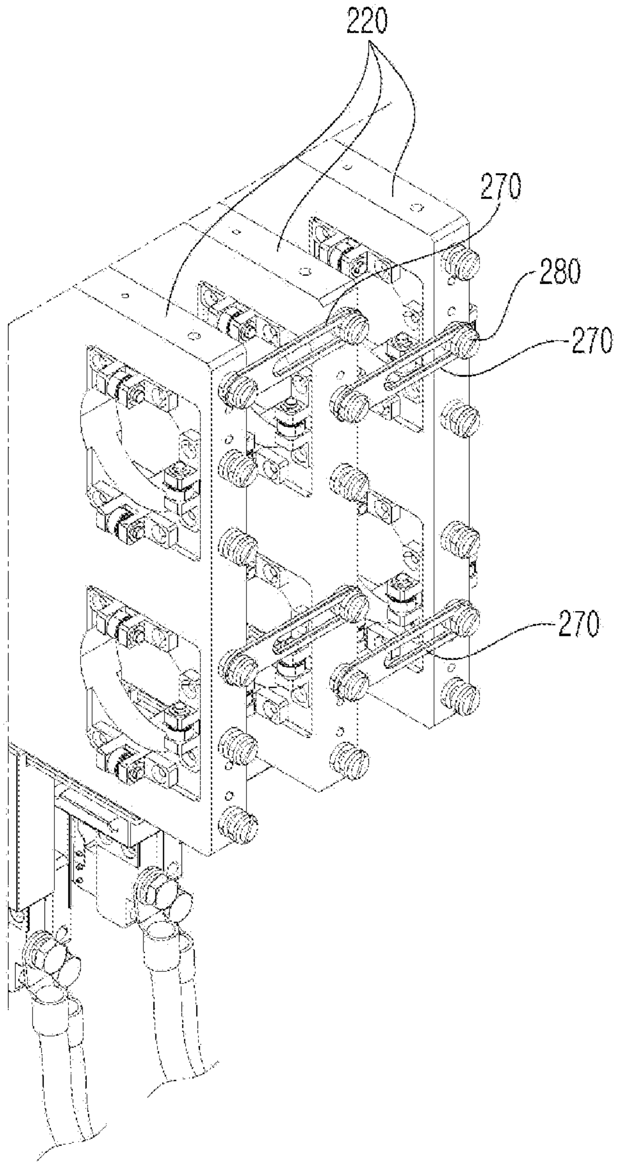
FIG. 6 is a view illustrating a state where a link according to the embodiments of the present disclosure is combined with a link fixation member.
Figure 7:
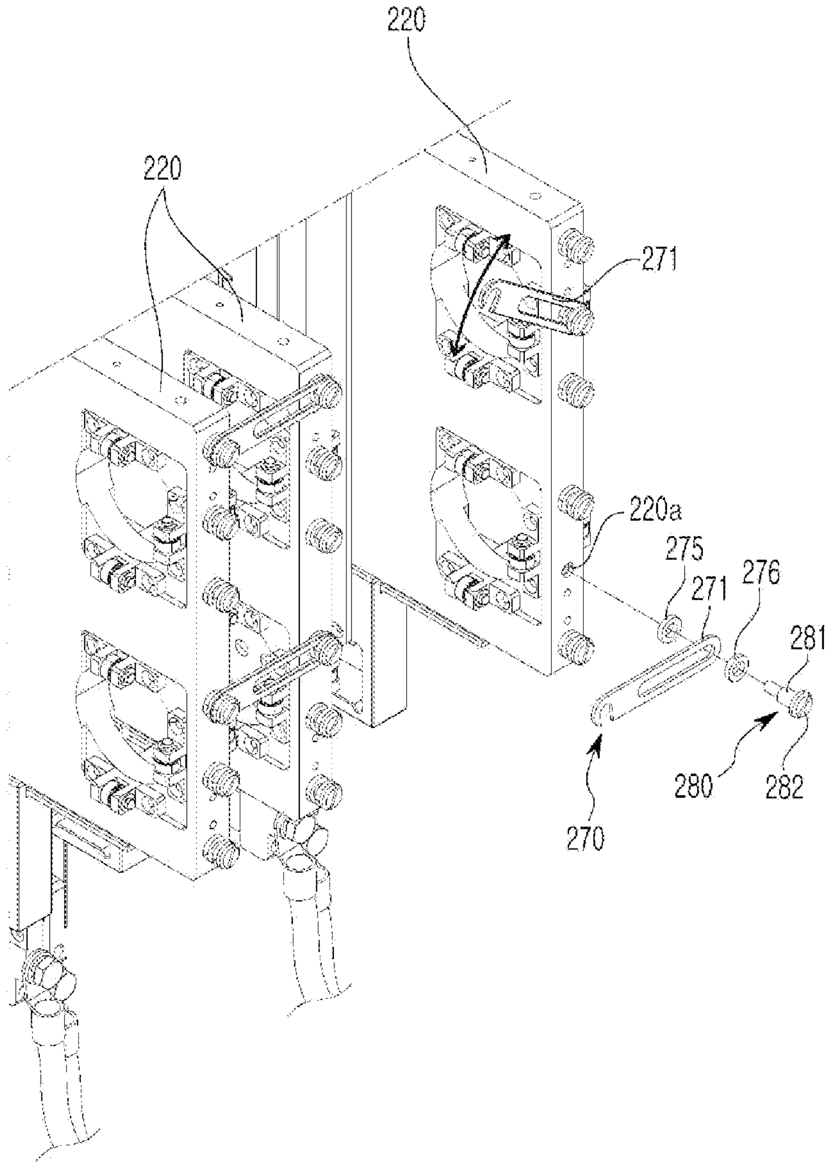
FIG. 7 is a view illustrating a state where the link according to the embodiments of the present disclosure is separated from the link fixation member.
Figure 8:
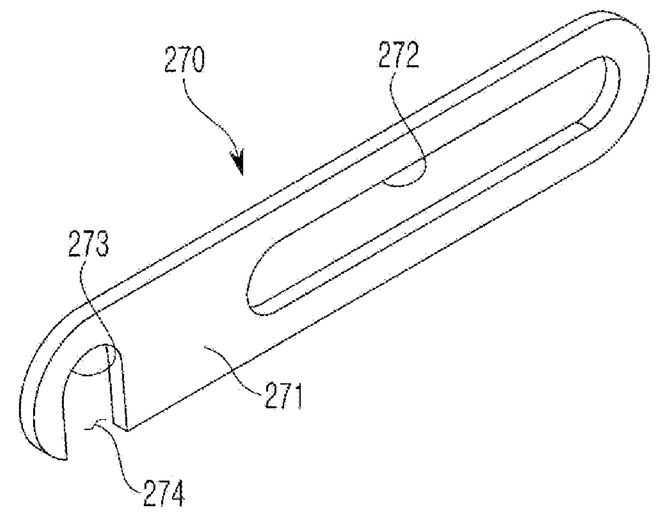
FIG. 8 is a perspective view illustrating the link according to the embodiments of the present disclosure.

FIG. 6 is a view illustrating a state where a link 270 according to the embodiments of the present disclosure is combined with a link fixation member 280. FIG. 7 is a view illustrating a state where the link 270 according to the embodiments of the present disclosure is separated from the link fixation member 280. FIG. 8 is a perspective view illustrating the link 270 according to the embodiments of the present disclosure.

As illustrated in FIGS. 6 to 8, the cell pressing module 200 may include the link 270.

The link 270 is arranged in such a manner that it adjusts a gap between the pressing plates 210 to a predetermined magnitude when the battery cell 10 is inserted into the battery insertion space 201.

The link 270 links together the movement guiding units 220 that are arranged adjacent to each other along the lengthwise direction of the plate moving shaft 175 and thus controls the gap between the pressing plates 210. That is, the gap between the pressing plates 210 may be controlled by adjusting a gap between the movement guiding units 220.

The link 270 is configured to include a link body 271 that forms the exterior appearance thereof. A first hole 272 is formed in the link body 271, but in one end portion of the link body 271. A second hole 273 is formed in the other end portion of the link body 271.

In this manner, the link body 271 in which the first hole 272 and the second hole 273 are formed connects together the movement guiding units 220 that are arranged adjacent to each other. The link 270 may be supported by the link fixation member 280.

The link fixation member 280, for example, may be configured as a fastening bolt. The fastening bolt is configured to include a fastening portion 281 and a head portion 282. The fastening portion 281 is combined, in a screw-fastened manner, with a fastening hole 220*a* formed in the movement guiding unit 220. The head portion 282 is combined with an end portion of the fastening portion 281 and is configured to prevent separation of the link 270. The head portion 282 is formed in such a manner as to have a greater outer diameter than the first hole 272 and the second hole 273. Thus, the link 270 may be prevented from being separated out of the link fixation member 280 in a state of being supported thereon.

For example, in a state of being supported on the link fixation member 280 combined with any one movement guiding unit 220 through the first hole 272, the link 270 may be fixed to the link fixation member 280 by being supported thereon. The link fixation member 280 is combined, through the second hole 273, with any other movement guiding unit 220 that is arranged adjacent to the movement guiding unit 220 that is combined with the first hole 272. In this manner, the link 270 is configured to connect the movement guiding units 220 that are arranged adjacent to each other.

The first hole 272 is formed, as a longitudinal hole, along a lengthwise direction of the link body 271. Thus, the link fixation member 280 may be moved along a lengthwise direction of the first hole 272 while the plurality of pressing plates 210 are pressed.

In a case where the first pressing unit 140 and the second pressing unit 160 are inclined toward the outside and the plurality pressing plates 210 are spaced a predetermined distance apart in order to perform an operation of activating a new battery cell 10, the link 270 controls a separation distance between the pressing plates 210. That is, the link fixation member 280 may be moved along the longitudinal direction of the first hole 272 in which the longitudinal hole is formed, and the plurality of pressing plates 210 may be arranged to be spaced an equal distance that is predetermined.

An opening 274 may be formed in the second hole 273. The opening 274 is formed in the second hole 273 in such a manner as to be exposed to the outside without being completely closed. The second hole 273 may be formed in the shape of a hook for fastening.

In this manner, the link 270 in which the opening 274 is formed may be fasten the link 270 to the link fixation member 280 even in a state where the link fixation member 280 is combined with an external surface of the movement guiding unit 220. That is, through the opening 274 formed in the second hole 273, the operator may fasten the second hole 273 to the fastening portion 281 of the link fixation member 280 that is pre-combined with the fastening hole 220*a*. The opening 274 is configured in such a manner as to have a width corresponding to an outer diameter of the fastening portion 281.

In a case where the link 270 needs to be separated, the operator may simply separate the second hole 273 combined with the fastening portion 281, through the opening 274 formed in the second hole 273. That is, in order to separate the link 270, the operator may simply separate the link 270 from the link fixation member 280 even in a state where the link fixation member 280 combined with the movement guiding unit 220 is not directly separated.

Therefore, when a maintenance operation is performed, such as cleaning of the entire apparatus 1000 for charging and discharging a secondary battery, the link 270 may be simply separated and combined.

The link 270 may include a first friction reduction member 275 and a second friction reduction member 276. The first friction reduction member 275 and the second friction reduction member 276 are configured in such a manner as to correspond to each other.

The first friction reduction member 275 and the second friction reduction member 276 are configured to reduce the occurrence of friction between the link 270 and the movement guiding unit 220 and the occurrence of friction between the link 270 and the link fixation member 280 while the pressing plate 210 is moved. These friction reduction members are configured to prevent the link fixation member 280 or the movement guiding unit 220 from being worn due to the friction between each of the constituent elements and thus to prevent fine metal shavings from occurring.

In this manner, the fine metal shavings that occur due to the friction between each of the constituent elements may cause many problems in a process of activating the battery cell 10.

Accordingly, the first friction reduction member 275 and the second friction reduction member 276 are configured to prevent the movement guiding unit 220 or the link fixation member 280 from being worn and thus to prevent the fine metal shavings from occurring.

It is desired that the first friction reduction member 275 and the second friction reduction member 276 are formed of, for example, a resin material. The link 270 may also be formed of a resin material.

The first friction reduction member 275 is provided between the movement guiding unit 220 and the link 270 in such a manner as to be inserted into the link fixation member 280 by passing-through. The second friction reduction member 276 is provided between the link 270 and the head portion 282 of the link fixation member 280 in such a manner that the link fixation member 280 is inserted into the second friction reduction member 276 by passing-through.

The first friction reduction member 275 and the second friction reduction member 276 may be formed of a material that causes less friction with each constituent element brought into contact, among resin materials.

In this manner, the first friction reduction member 275 may be provided between the movement guiding unit 220 and the link 270, and the second friction reduction member 276 is provided between the link 270 and the link fixation member 280. Thus, the fine metal shavings may be prevented from occurring due to the wearing of the movement guiding unit 220 or of the link fixation member 280.

Since the opening 274 is formed in the link 270, when performing an operation of separating the movement guiding unit 220 connected through the link 270, the operator may simply disconnect the movement guiding unit 220 through the opening 274. That is, since the opening 274 is formed in the link 270 according to the present disclosure, the link 270 may be disconnected even without the link fixation member 280 being directly separated from the movement guiding unit 220. At this point, when a structure where the link fixation member 280 combined by bolt-nut fastening with the fastening hole 220*a* has to be directly separated in order to disconnect the link 270 is employed, the fine metal shavings may occur while the link fixation member 280 is separated.

Figure 9:
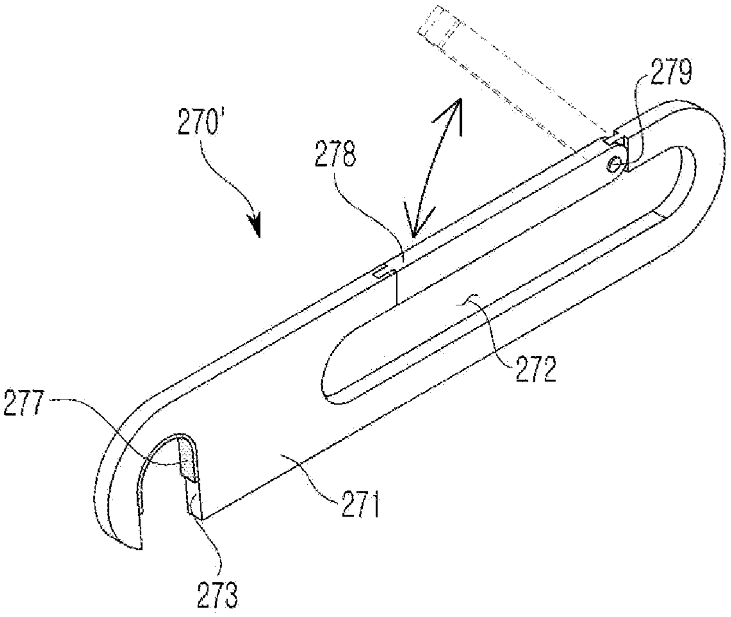
FIG. 9 is a perspective view illustrating a link according to embodiments of the present disclosure.

FIG. 9 is a perspective view illustrating a link 270' according to embodiments of the present disclosure.

As illustrated in FIG. 9, the link 270' may include a fixation elastic member 277. The fixation elastic member 277 is provided on an internal surface of the second hole 273.

The fixation elastic member 277, for example, may be formed of a rubber material. The fixation elastic member 277 is configured to increase adhesion to the fastening portion 281 in a state where the second hole 273 is combined with the fastening portion 281 by being inserted thereinto. Therefore, in the state where the fastening portion 281 is inserted into the second hole 273 for being combined therewith, the fastening portion 281 may be stably fixed in the second hole 273 without being prevented from being shaken.

The link 270' may include an opening-closing adjustment unit 278. The opening-closing adjustment unit 278 is configured to selectively open the first hole 272.

The opening-closing adjustment unit 278, for example, is configured to be rotatable about a hinge shaft 279 provided on the link body 271 in which the first hole 272 is formed. Therefore, in a case where the link 270' needs to be replaced because damage to the link 270' or the like takes place, it is possible to replace the link 270' in a state where the link fixation member 280 is not separated from the movement guiding unit 220.

For example, in a case where the operator separates the link 270' from the movement guiding unit 220, the operator may first separate the second hole 273 from the fastening portion 281 and may separate the fastening portion 281 from the first hole 272 in a state where the opening-closing adjustment unit 278 is rotated from the link fixation member 280. The link 270' may be completely separated from the link fixation member 280 in a state where the link fixation member 280 is not separated from the movement guiding unit 220.

Figure 10:
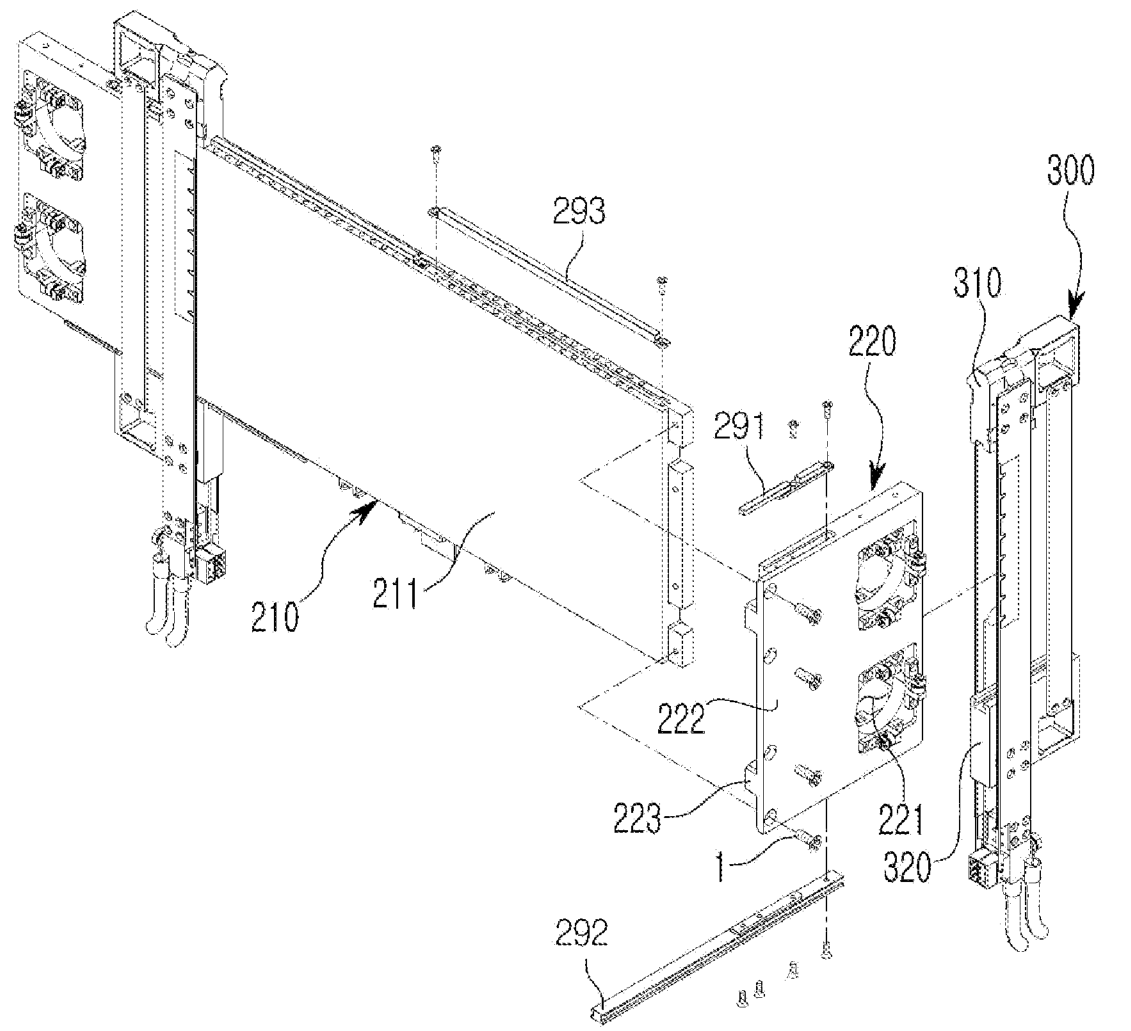
FIG. 10 is an exploded perspective view illustrating a movement guiding unit and a pressing plate according to the embodiments of the present disclosure.
Figure 11A:
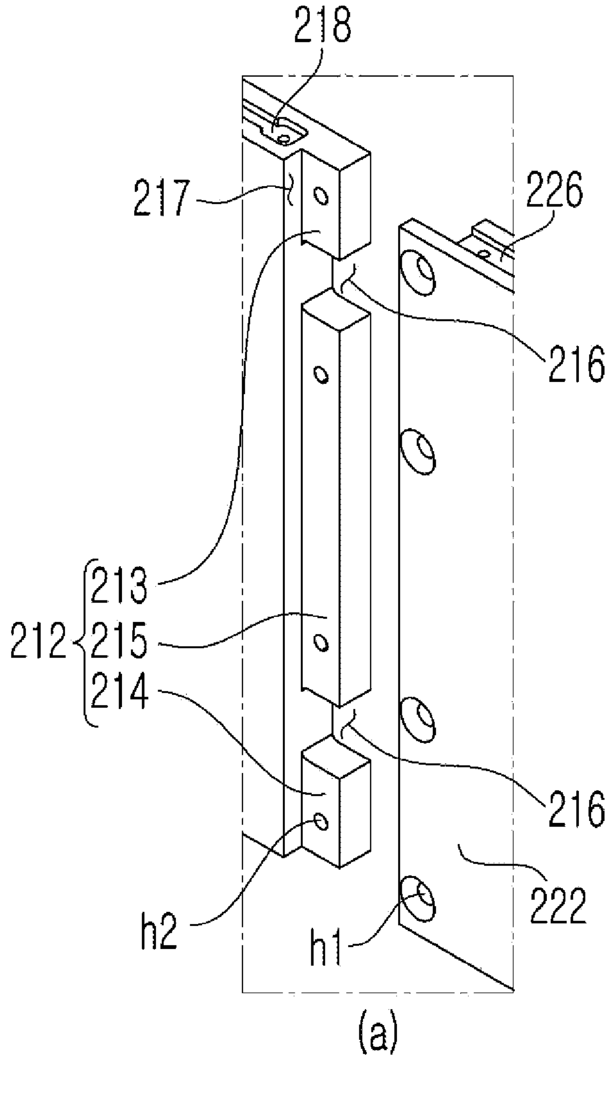
FIGS. 11A and 11B are views each illustrating essential portions of the movement guiding unit and the pressing plate according to the embodiments of the present disclosure.
Figure 11B:
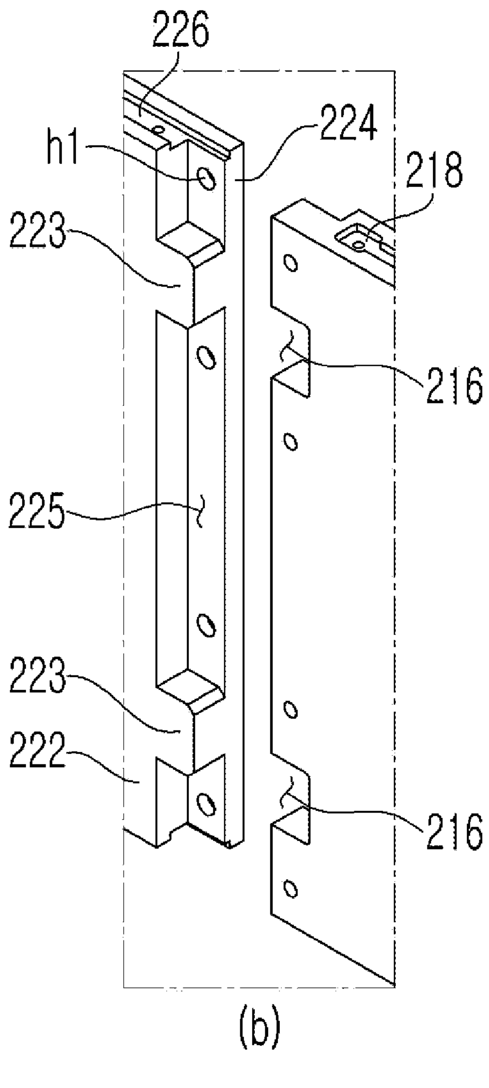
Figure 12A:
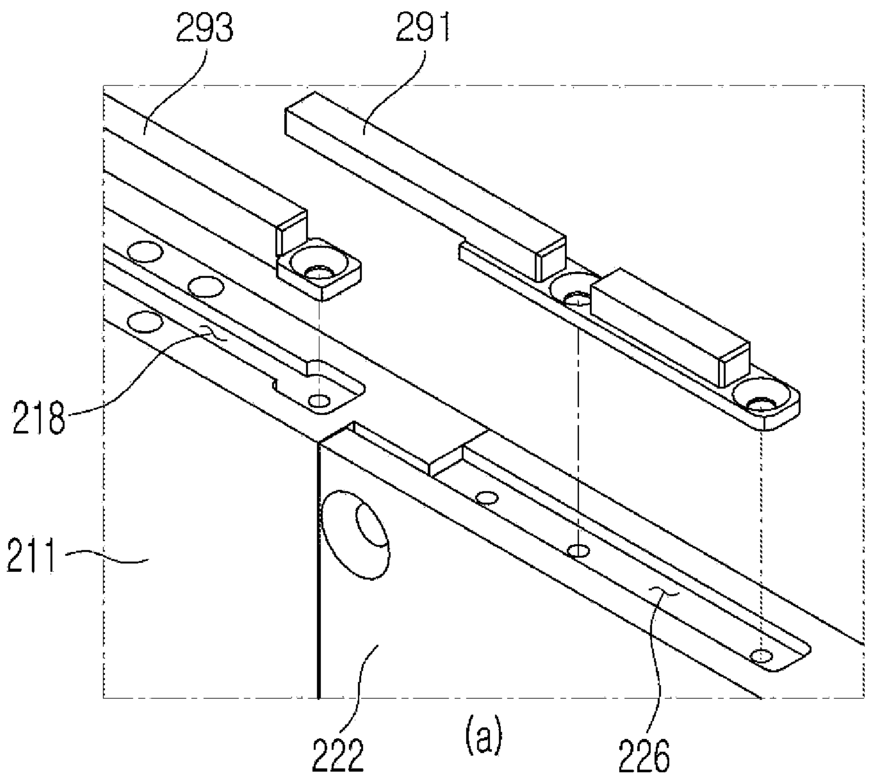
FIGS. 12A and 12B are an exploded perspective view illustrating an upper guide bar and a lower guide bar according to the embodiments of the present disclosure.
Figure 12B:
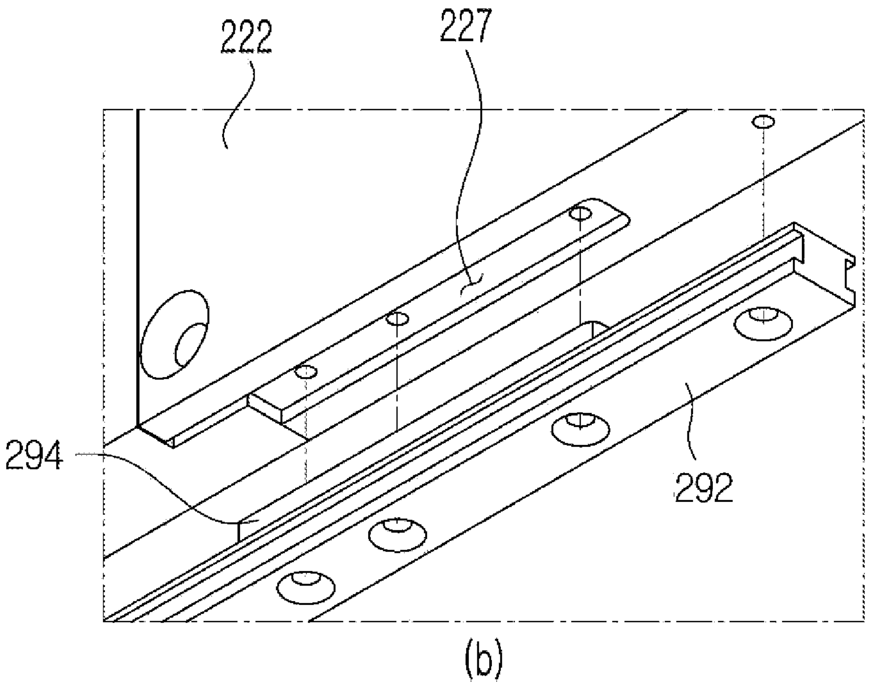

FIG. 10 is an exploded perspective view illustrating the movement guiding unit 220 and the pressing plate 210 according to the embodiments of the present disclosure. FIGS. 11A and 11B are views each illustrating essential portions of the movement guiding unit 220 and the pressing plate 210 according to the embodiments of the present disclosure. FIG. 11A is a view illustrating the essential portions of the movement guiding unit 220 and the pressing plate 210, when viewed from one side. FIG. 11B is a view illustrating the essential portions of the movement guiding unit 220 and the pressing plate 210, when viewed from the other side. FIGS. 12A and 12B are an exploded perspective view illustrating an upper guide bar 291 and a lower guide bar 292 according to the embodiments of the present disclosure.

As illustrated in FIGS. 10 to 12B, the pressing plate 210 is configured to be detachably attached to the movement guiding unit 220. Accordingly, although damage to the pressing plate 210 takes place in a state where the movement guiding unit 220 that is arranged in the vicinity is connected by the link 270, there is no need to separate the entire cell pressing module 200, including the pressing plate 210 and the movement guiding unit 220, from the plate moving shaft 175. Moreover, the effect of replacing only the pressing plate 210 by being separated from the movement guiding unit 220 without operating the link 270 can be achieved.

The pressing plate 210 may be combined with the movement guiding unit 220 by a fastening member 1, such as a bolt. For reference and for convenience in description, FIG. 6 illustrates that the pressing plate 210 and the movement guiding unit 220 are separable. When the pressing plate 210 is actually separated from the movement guiding unit 220, the pressing plate 210 may be separated from the movement guiding unit 220 in a state where the movement guiding unit 220 is fixed to the plate moving shaft 175, thereby being supported thereon.

The pressing plate 210 may include a pressing body 211 and an insertion coupling portion 212.

The pressing body 211 forms the exterior appearance of the pressing plate 210. The pressing body 211 is configured to press against the battery cell 10.

The insertion coupling portions 212 are configured to protrude from both-side surfaces, respectively, of the pressing body 211. The insertion coupling portions 212 that protrude from one-side and other-side surfaces, respectively, from the pressing body 211 are configured to have the same shape.

The insertion coupling portion 212 is combined with the movement guiding unit 220 in a state of being inserted into an insertion space 225 formed in the movement guiding unit 220.

The insertion coupling portion 212 may include an upper insertion protrusion 213, a lower insertion protrusion 214, and an intermediary insertion protrusion 215.

The upper insertion protrusion 213 is provided on an upper portion of the pressing body 211.

A shape of the lower insertion protrusion 214 corresponds to that of the upper insertion protrusion 213, and the lower insertion protrusion 214 is provided on a lower portion of the pressing body 211.

The intermediary insertion protrusion 215 is provided between the upper insertion protrusion 213 and the lower insertion protrusion 214. The intermediary insertion protrusion 215 is arranged to be spaced apart from the upper insertion protrusion 213 and is also arranged to be spaced apart from the lower insertion protrusion 214.

In this manner, the upper insertion protrusion 213, the lower insertion protrusion 214, and the intermediary insertion protrusion 215 are arranged to be spaced from each other, and form an assembly insertion groove 216 into which a support protrusion 223 provided on the movement guiding unit 220 is inserted.

The pressing body 211 is formed in such a manner as to have a greater thickness than the upper insertion protrusion 213, the lower insertion protrusion 214, and the intermediary insertion protrusion 215. The protruding of the upper insertion protrusion 213, the lower insertion protrusion 214, and the intermediary insertion protrusion 215 from both-side surfaces of the pressing body 211 may form a fastening insertion groove 217 into which a fastening extension portion 224 provided on the movement guiding unit 220 is inserted.

The movement guiding unit 220 may include a moving body 222, the support protrusion 223, and the fastening extension portion 224.

The moving body 222 forms the exterior appearance of the movement guiding unit 220. The movement guiding hole 221 is formed in the moving body 222, and the movement guiding unit 220 may be moved along the plate moving shaft 175 inserted into the movement guiding hole 221.

The insertion space 225 into which the insertion coupling portion 212 is inserted is formed in an internal surface of the moving body 222. The insertion space 225 may be formed by the support protrusion 223 protruding from the internal surface of the moving body 222.

The insertion space 225 is configured to correspond to the insertion coupling portion 212. The insertion coupling portion 212 and the insertion space 225 have male and female shapes, respectively, and the insertion coupling portion 212 may be combined with the insertion space 225 by being inserted thereinto.

The support protrusion 223 protrudes from the moving body 222. The support protrusions 223 constitute one pair in a state of being arranged to be spaced a predetermined distance.

The support protrusion 223 and the assembly insertion groove 216 have male and female shapes, respectively, and the support protrusion 223 may be combined with the assembly insertion groove 216 by being inserted thereinto.

In this manner, the insertion coupling portion 212 is provided on the pressing plate 210, and the support protrusion 223 is provided on the movement guiding unit 220. Thus, the pressing plate 210 and the movement guiding unit 220 may be firmly combined with each other in a fitting-together manner.

The fastening extension portion 224 is configured to extend from the moving body 222 and to be inserted into the fastening insertion groove 217. A first fastening hole h1 is formed in the fastening extension portion 224, and a second fastening hole h2 is formed in the insertion coupling portion 212. The fastening member 1 is inserted into the first fastening hole h1 and the second fastening hole h2 by passing-through, thereby combining the pressing plate 210 and the movement guiding unit 220 with each other.

The cell pressing module 200 may include an upper guide bar 291, a lower guide bar 292, and a connection guide bar 293.

The upper guide bar 291 is combined with an upper fixation groove 226 by being inserted thereinto. The upper fixation groove is formed in an upper portion of the movement guiding unit 220. The upper guide bar 291 is configured to guide moving of an upper fixation block 310 provided on the electrode lead gripper module 300.

One end portion of the upper guide bar 291 is combined with the movement guiding unit 220 through a combination member, such as a bolt. The other end portion of the upper guide bar 291 supports an upper surface of the pressing plate 210.

The upper guide bar 291 is arranged adjacent to the connection guide bar 293 that is combined with a guide fixation groove 218 by being inserted thereinto. The guide fixation groove 218 is formed in an upper portion of the pressing plate 210. Accordingly, the upper fixation block 310 may be moved along the upper guide bar 291 and the connection guide bar 293 that are arranged adjacent to each other.

The lower guide bar 292 is combined with a lower fixation groove 227 by being inserted thereinto. The lower fixation groove 227 is formed in a lower portion of the movement guiding unit 220. A fixation member 294 that is inserted into the lower fixation groove 227 is provided on the lower guide bar 292. The lower guide bar 292 may be firmly combined with the movement guiding unit 220. The lower guide bar 292 is configured to guide moving of a lower fixation block 320 provided on the electrode lead gripper module 300.

One end portion of the lower guide bar 292, like that of the upper guide bar 291, is combined with the movement guiding unit 220 through the combination member, such as a bolt. The other end portion of the lower guide bar 292 supports a lower surface of the pressing plate 210. The upper guide bar 291 and the lower guide bar 292 are configured to guide moving of the electrode lead gripper module 300 and at the same time to stably support upper and lower portions, respectively, of the pressing plate 210.

Figure 13:
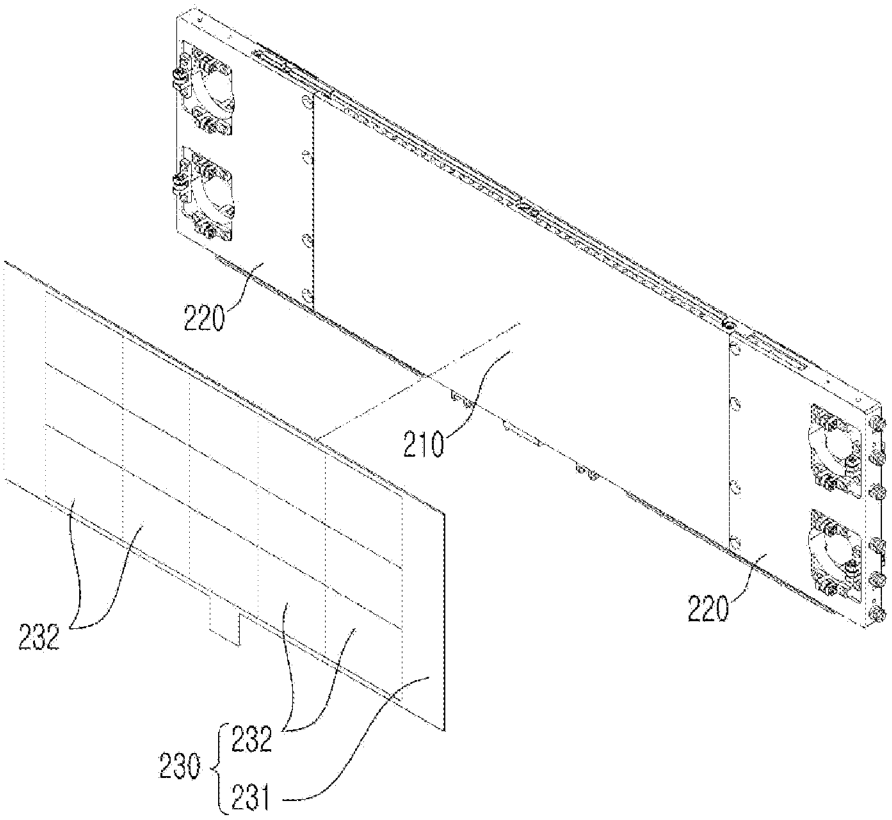
FIG. 13 is an exploded perspective view illustrating the pressing plate and a heating pad according to the embodiments of the present disclosure.
Figure 14:
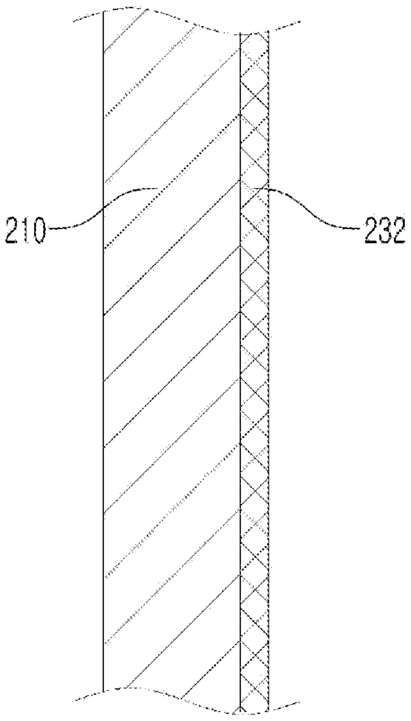
FIG. 14 is a cross-sectional view illustrating a pressing plate and a heating pad according to the embodiments of the present disclosure.

FIG. 13 is an exploded perspective view illustrating the pressing plate 210 and a heating pad 230 according to the embodiments of the present disclosure. FIG. 14 is a cross-sectional view illustrating the pressing plate 210 and the heating pad 230 according to the embodiments of the present disclosure.

As illustrated in FIGS. 13 and 14, the heating pad 230 provided on the cell pressing module 200 is combined with one surface of the pressing plate 210. The heating pad 230 is configured to heat the pressing plate 210 to a predetermined temperature.

The heating pad 230 may include a pad support member 231 and a heating member 232. The pad support member 231 is configured to support a plurality of the heating members 232 that are provided inside the pad support member 231. The pad support member 231 supports the heating member 232 and, at the same time, is electrically connected to the heating member 232. Thus, electric power that is transferred to the pad support member 231 may be supplied to the heating member 232.

In this manner, the heating pad 230 that is combined with one surface of the pressing plate 210 is configured in such a manner that a combination surface thereof corresponds to a combination surface of the pressing plate 210. That is, the pressing plate 210 and the heating pad 230 are configured in such a manner that the combination surfaces thereof correspond to each other.

In this manner, the pressing plate 210 presses against the battery cell 10 with a predetermined pressure in a state of being heated by the heating pad 230 to the predetermined temperature.

The heating pad 230 may be made from an epoxy plate in which a heating line is provided. The heating pad 230 made from the epoxy plate has an excellent combining force when combined with the pressing plate 210 and thus may be firmly combined with the pressing plate 210. In addition, the heating pad 230 made from the epoxy plate has high thermal conductivity at the combination surface. Thus, heat generated from the heating pad 230 may be effectively transferred to the pressing plate 210.

In this manner, the heating pad 230 that heats the pressing plate 210 may be heated to, for example, a temperature of 130° C. or below. It is more desired that the heating pad 230 heats the pressing plate 210 to a range of 110 to 130° C. However, the temperature to which the heating pad 230 heats the pressing plate 210 is not necessarily limited to 130° C. or lower. Of course, the pressing plate 210 may be heated to a temperature of above 130° C.

The cell pressing module 200 according to the present invention has a structure different from a structure where a heating pad is provided between two pressing plates in the related art. That is, the heating pad 230 is provided on only one surface of the pressing plate 210. Thus, an operation of replacing the pressing plate 210 or the heating pad 230 may be simply performed. That is, the heating pad 230 and the pressing plate 210 are simply separated from each other. Thus, for example, in a case where the heating pad 230 needs to be replaced, the operator may simply replace the heating pad 230.

The cell pressing module in which the heating pad is inserted between the two pressing plates in the related art is designated in such a manner as to have a predetermined thickness. Due to the predetermined thickness of the cell pressing module, the pressing plates that are provided to both sides, respectively, of the heating pad result in having a small thickness. Therefore, the pressing plate that has a small thickness may be warped while the pressing plate presses against the battery cell 10. In this manner, in a case where the pressing plate is warped, there occurs a problem in that the warped pressing plate does not uniformly press against a pressing surface of the battery cell 10.

In order to solve this problem, the pressing plates that are provided to both sides, respectively, of the heating pad may be formed in such a manner as to have a predetermined thickness or greater. However, in this case, there occurs a problem in that the overall size of the cell pressing module is increased.

In contrast, in the cell pressing module 200 according to the present disclosure, the heating pad 230 is provided on only one surface of the pressing plate 210. Accordingly, the pressing plate 210 may have a predetermined thickness or greater. In this case, the pressing plate 210 may be prevented from being warped while the pressing plate 210 presses against the battery cell 10. In addition, since the heating pad 230 is provided on only one surface of the pressing plate 210, a pressing surface of the pressing plate 210 that presses against the battery cell 10 may have exact parallelism.

The protective pad 240 to be provided on the cell pressing module 200 is configured to protect the pressing plate 210 and the heating pad 230 from the outside.

For example, a cover insertion space which is "⊏"-shaped and into which the pressing plate 210 and the heating pad 230 are inserted may be formed in the protective pad 240, and the pressing plate 210 and the heating pad 230 may be covered with the protective pad 240.

The protective pad 240 may be formed of, for example, a silicone material. The protective pad 240 made of a silicon material is configured to prevent a surface of the battery cell 10 from being damaged due to the pressing plate 210 and the heating pad 230 while the pressing plate 210 presses against the battery cell 10.

Figure 15:
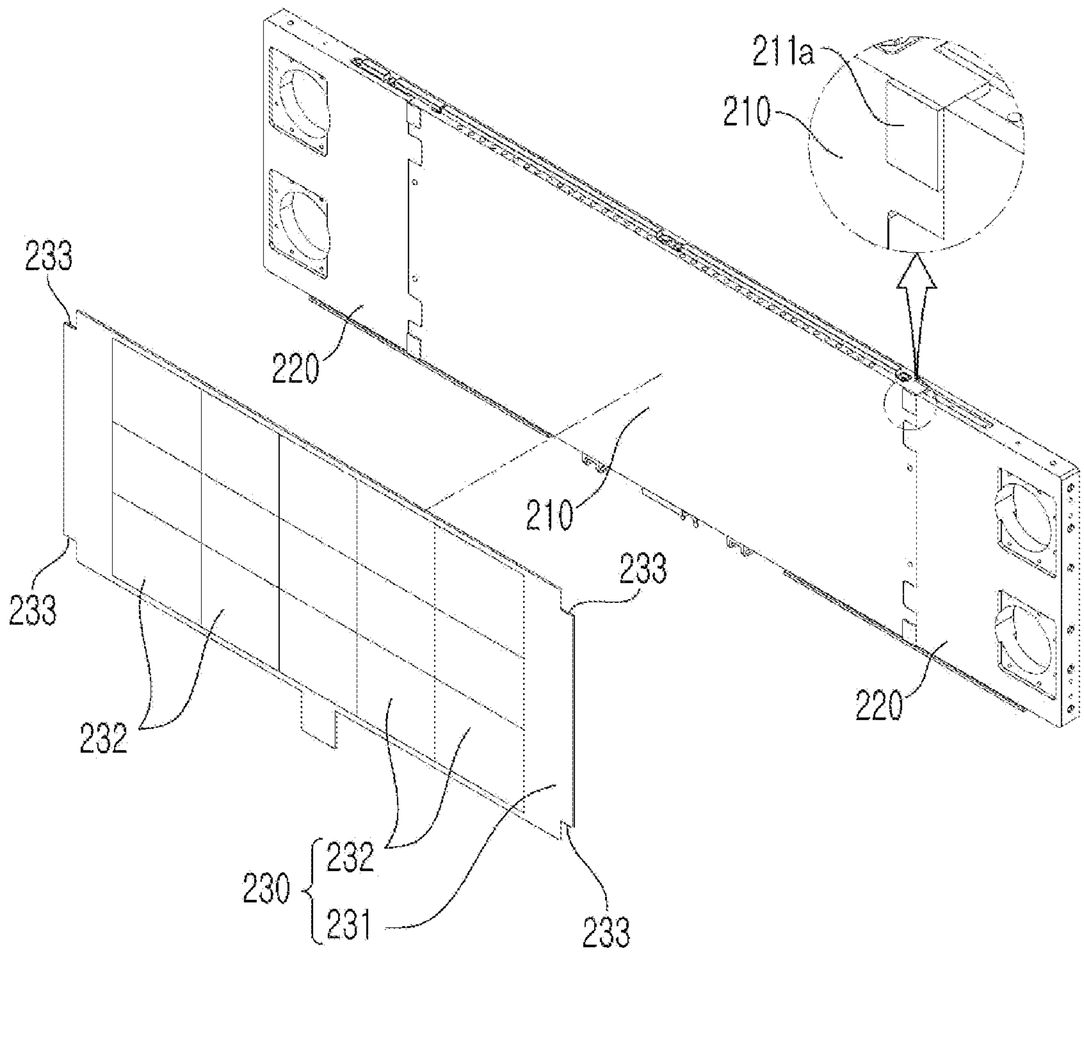
FIG. 15 is an exploded perspective view illustrating a pressing plate and a heating pad according to a third embodiment of the present disclosure.

FIG. 15 is an exploded perspective view illustrating a pressing plate and a heating pad according to a third embodiment of the present disclosure.

As illustrated in FIG. 15, a combination-position protrusion 210*a* is formed to protrude from a combination surface of the pressing plate 210 with which the heating pad 230 is combined. A combination-guide fixation jaw 233 that corresponds to the combination-position protrusion 210*a* is provided on an edge portion of the pad support member 231 provided on the heating pad 230.

When the heating pad 230 and the pressing plate 210 are combined with each other, the combination-position protrusion 210*a* and the combination-guide fixation jaw 233 are combined with each other in a state where they are engaged with each other. In this manner, the combination-position protrusion 210*a* and the combination-guide fixation jaw 233 are configured in such a manner as to guide the heating pad 230 and the pressing plate 210 to a combination position when the heating pad 230 and the pressing plate 210 are combined with each other.

It is desired that the combination-position protrusion 210*a* is configured in such a manner that a distance over which the combination-position protrusion 210*a* protrudes is the same as a thickness of the heating pad 230. The reason for this is to flatten upper surfaces of the heating pad 230 and the combination-position protrusion 210*a* with respect to each other in a state where the heating pad 230 is combined with the pressing plate 210.

The desired embodiments of the present disclosure that are described above are exemplary embodiments. Therefore, the scope of the present disclosure is not limited to the descriptions of the desired embodiments.

The desired embodiments of the present disclosure are described above in an exemplary manner. It would be understood by a person of ordinary skill in the art to which the present disclosure pertains that the desired embodiments of the present disclosure are readily modified into specific forms without changing the technical idea of the present disclosure and essential features thereof. Therefore, in every aspect, the desired embodiments described above should be understood as being exemplary and non-restrictive. For example, the constituent elements that are described as having their respective single forms may be implemented in a distributed manner, and likewise, the constituent elements that are described as being distributed may be implemented in a combined manner.

The scope of the present disclosure is defined by the following claims, and all modifications or alterations that are derived from the meaning of claim language and the scope of the claims and from equivalents of the claims should be construed as falling within the scope of the present disclosure.

The invention claimed is:

1. A cell pressing module comprises:

a plurality of movement guiding units provided on both sides, respectively, of a pressing plate pressing against a battery cell, a movement guiding hole into which a plate moving shaft is inserted by passing-through being formed in each of the plurality of movement guiding units; and a link linking together the movement guiding units arranged adjacent to each other along a lengthwise direction of the plate moving shaft, and adjusting a separation distance between the movement guiding units, wherein both end portions of the link are supported on link fixation members, respectively, that are combined with external surfaces, respectively, of the movement guiding units that are arranged adjacent to each other, wherein the link has a link body that forms the exterior appearance of the link, wherein a first hole is formed in one end portion of the link body in a linear longitudinal hole shape such that the link fixation member is linearly movable along the first hole, and wherein a second hole is formed in the other end portion of the link body in a hook shape having an opening exposed to the outside for detachable coupling to the link fixation member.

2. The cell pressing module of claim 1, wherein the opening is configured to have a width corresponding to an outer diameter of a fastening portion of the link fixation member, and a fixation elastic member is provided on an internal surface of the second hole.

3. The cell pressing module of claim 1, wherein an opening-closing adjustment unit that selectively opens the first hole is provided on the link body, and wherein the opening-closing adjustment unit is configured to be rotated about a hinge shaft from the link body.

4. The cell pressing module of claim 1, wherein the link comprises:

a first friction reduction member provided between the movement guiding unit and the link body, a fastening portion of the link fixation member being inserted into the first friction reduction member by passing therethrough; and a second friction reduction member provided between the link body and a head portion of the link fixation member, the fastening portion of the link fixation member being inserted into the second friction reduction member by passing therethrough.

5. The cell pressing module of claim 4, wherein the first friction reduction member and the second friction reduction member are formed of a resin material.

6. The cell pressing module of claim 1, wherein the pressing plate is configured to be detachably attached to the movement guiding unit.

7. The cell pressing module of claim 6, wherein the pressing plate comprises:

a pressing body pressing against the battery cell; and insertion coupling portions protruding from both-side surfaces, respectively, of the pressing body, each of the insertion coupling portions being combined with an insertion space, formed in the movement guiding unit, by being inserted thereinto, wherein the insertion coupling portion comprises:

an upper insertion protrusion provided on an upper portion of the pressing body;

a lower insertion protrusion provided on a lower portion of the pressing body; and an intermediary insertion protrusion provided between the upper insertion protrusion and the lower insertion protrusion, and wherein the upper insertion protrusion, the lower insertion protrusion, and the intermediary insertion protrusion are configured to be spaced from each other and to form an assembly insertion groove.

8. The cell pressing module of claim 7, wherein the pressing body is configured to have a greater width than the upper insertion protrusion, the lower insertion protrusion, and the intermediary insertion protrusion in order to form a fastening insertion groove.

9. The cell pressing module of claim 8, wherein the movement guiding unit comprises:

a moving body, an insertion space into which the insertion coupling portion is inserted being formed in an internal surface of the moving body;

a pair of support protrusions spaced a predetermined distance apart, the pair of support protrusions protruding from an internal surface of the moving body and being inserted into the assembly insertion groove; and a fastening extension portion extending from the moving body and being inserted into the fastening insertion groove, and wherein a first fastening hole is formed in the fastening extension portion, a second fastening hole is formed in the insertion coupling portion, and a fastening member is inserted into the first fastening hole and the second fastening hole by passing-through, and thus combines the pressing plate and the movement guiding unit with each other.

10. The cell pressing module of claim 7, further comprising:

an upper guide bar being combined with an upper fixation groove by being inserted thereinto, the upper fixation groove being formed in an upper portion of the movement guiding unit, and guiding moving of an upper fixation block provided on an electrode lead gripper module; and a lower guide bar being combined with a lower fixation groove by being inserted thereinto, the lower fixation groove being formed in a lower portion of the movement guiding unit, and guiding moving of a lower fixation block provided on the electrode lead gripper module.

11. The cell pressing module of claim 10, further comprising:

a connection guide bar being combined with a guide fixation groove by being inserted thereinto, the guide fixation groove being formed in an upper portion of the pressing plate, and guiding moving of the upper fixation block, wherein the connection guide bar and the upper guide bar are arranged adjacent to each other, and thus guide the moving of the upper fixation block.

* * * * *